June 4, 1929.　　　G. F. NICHOLAS　　　1,715,379
AUTOMOBILE CONSTRUCTION
Filed June 20, 1925　　　2 Sheets-Sheet 1
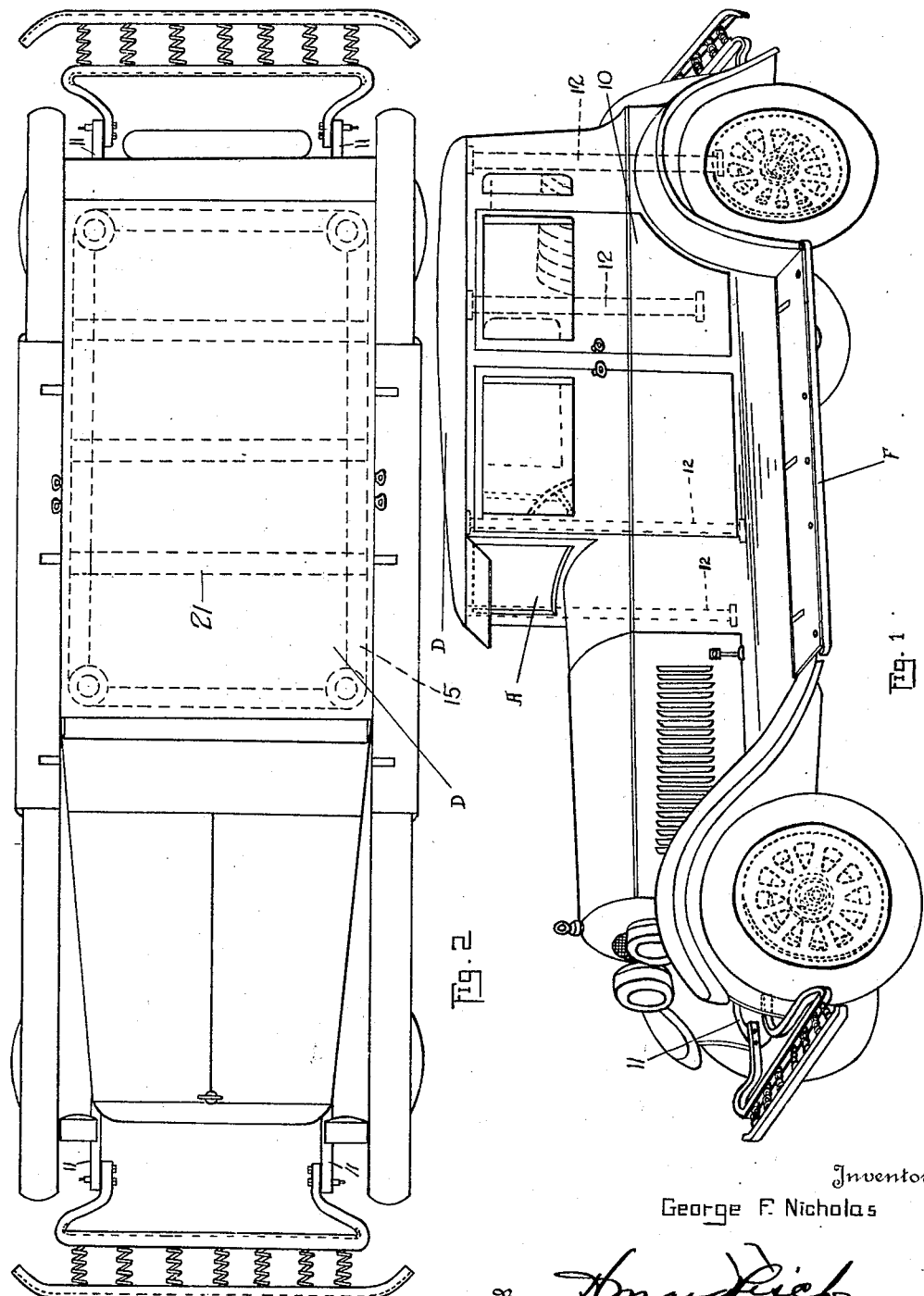
Inventor
George F. Nicholas
By (signature)
Attorney

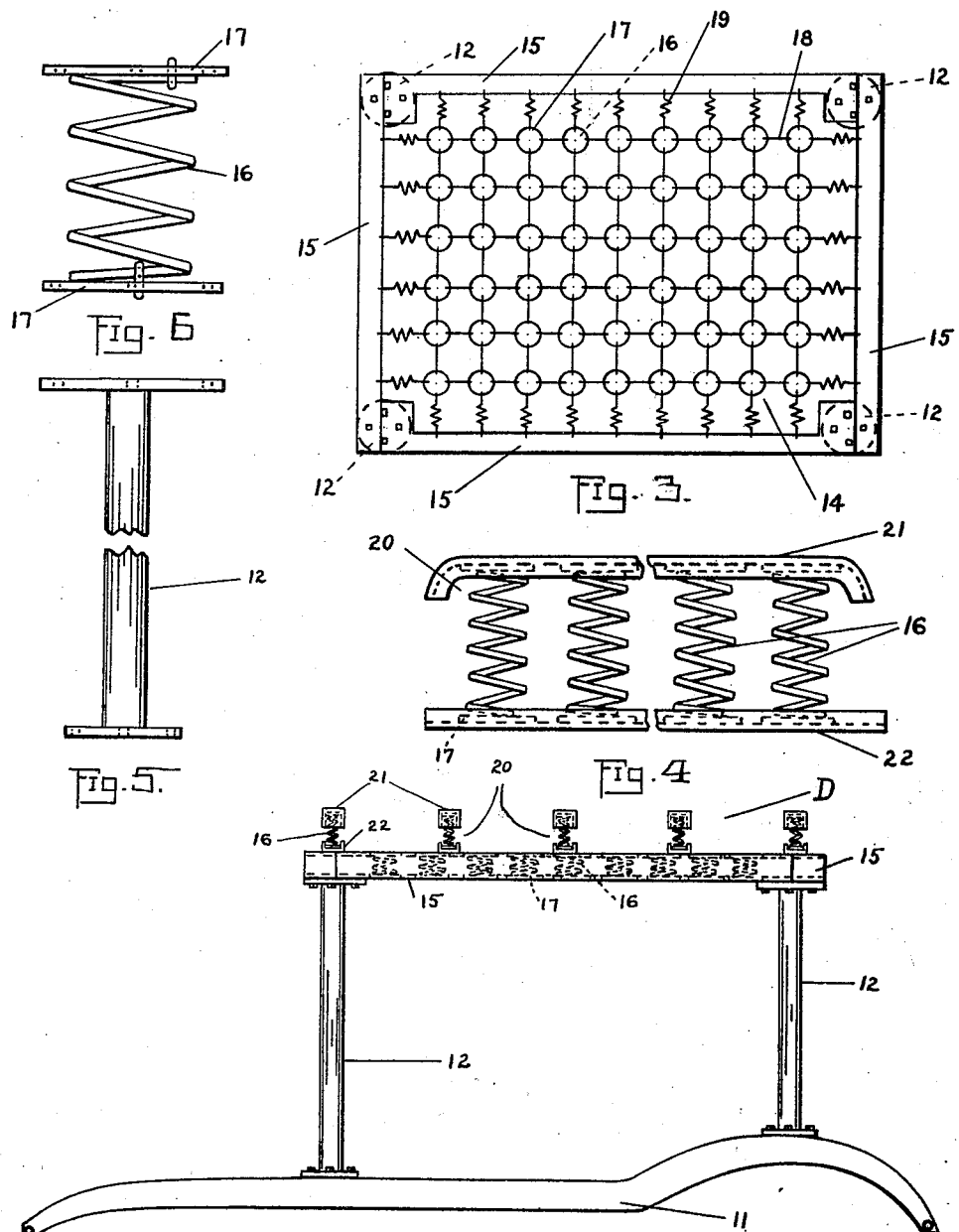

Patented June 4, 1929.

1,715,379

UNITED STATES PATENT OFFICE.

GEORGE F. NICHOLAS, OF ST. PAUL, MINNESOTA.

AUTOMOBILE CONSTRUCTION.

Application filed June 20, 1925. Serial No. 38,574.

My invention relates to automobile construction wherein it is desired to provide an automobile of a nature to withstand shock and jar in an accident and to protect the occupants in the same.

A feature of my invention is to provide an automobile body which is formed with cushioning means across the top to prevent the occupants of the automobile from being injured if the top is crushed, as it would be with ordinarily constructed automobile bodies. This protecting means for the top consists of spring or resilient means adapted to prevent the top of the auto from crushing and that will absorb any ordinary shock or blow which might be received. This protecting means across the top of the automobile body consists of a series of spring cushioning members on the outside of the top covered with the ordinary covering means to protect the resilient members and concealed so as not to mar the appearance of the car, yet positioned in a manner so that if the automobile turns completely over, any pressure or shock against the top will be absorbed by the resilient members. The inner resilient protecting means is adapted to protect the occupants of the car from injury and serious bruising.

The invention further includes means for reinforcing the body of the automobile in a manner to provide standard members in the corners of the body which extend from the frame to the top structure of the body, and which are made of steel or other suitable means of a very strong nature. I further reinforce my automobile by providing reinforcing columns through the body so as to prevent the top from crushing in on the occupants of the car. This is an important feature of the invention. These features, together with other details of construction and particular formation and arrangement of the parts, will be more fully set forth in the specification and claims.

In the drawings forming part of this specification:

Figure 1 is a perspective side view of an automobile illustrating diagrammatically my invention applied thereto.

Figure 2 is a plan view of the same illustrating my invention applied thereto.

Figure 3 illustrates the inside spring frame and protection for the occupants of the car from the inside.

Figure 4 illustrates the formation of the bows used across the top of my automobile construction.

Figure 5 illustrates one of the corner members for bracing and supporting the top from the automobile frame.

Figure 6 illustrates the ordinary helical spring used throughout the construction of my automobile in carrying out my invention.

Figure 7 illustrates diagrammatically the frame of my automobile showing the relation of the supporting means for the top to the frame.

In the drawings A represents an automobile of ordinary general appearance having front wheels B and rear wheels C which are operated in the ordinary well known manner.

The automobile A is provided with a body of the closed type, such as 10, which is secured to the frame 11 of the automobile A in the ordinary manner by bolting the same to the frame 11.

My automobile body 10 is reinforced and strengthened by standards 12 rod-like in nature which are made of steel or any other suitable strong material. I use several of these standards 12 but the number can be varied as the occasion may require for a heavy or a light car. In the drawings, I have illustrated four of these upright standards 12 which are secured to the frame 11 on one end and which support the top D on the other end. These standards 12 form the corner members of my automobile A providing a rigid strong reinforcing means which is concealed within the body 10 in a manner so as to not detract from the general appearance of the same. However, these members 12 provide such strengthening means as to so reinforce my automobile body 10 that it can turn over and stand upside down on the top D without appreciable injury to the top such as crushing of the same. In fact, these standards 12 are designed to overcome the crushing of the top if the automobile A should tip over.

The top of my automobile D is made up of an inner cushioning member 14 which is provided with a frame 15. This frame 15 is adapted to be connected and bolted to the upper end of the standards 12 at each corner so as to support the same. In a large heavy car standards can be used along the sides of the frame if it is desired. The cushioning member 14 is provided with a series of spring members 16 of a helical coil spring nature.

These spring members 16 are illustrated in Figure 6 in side elevation and are provided with a top and bottom plate 17. These plates are connected together by the link members 18. Side springs 19 connect the outer or marginal row of spring members 16 to the frame 15. In this manner I provide a cushioning means 14 inside the body 10 against which the occupants of the car will strike in case of an accident and the car should tip over, thus protecting the occupants against injury to a very large degree.

The outer structure of my top D is provided with a series of bow or rib members 20 which extend across the outer portion of the frame 15 and form the rib or bow portions for supporting the outer cover or top of the automobile A. These rib members 20 are formed with a top channel member 21 and a bottom channel member 22 between which coil spring members 16 are positioned to space the members 21 and 22 apart and to provide means for absorbing any shock or blow against the top of the car. These springs 16 used in the bow members 20 can be of a heavier nature than those used in the inner spring cushion 14. Thus the top D of my car A is provided with a suitable means of protecting the occupants and protecting the body 10 against being crushed, should the same be turned upside down in an accident.

In this manner I provide an automobile A having means in the top of the car and within the body of the same, to strengthen the same in a manner so as to prevent crushing of the top and to protect the car against ordinary shock and blow. This construction of the body and frame provides an automobile of a desirable nature so as to prevent the damaging of the automobile in ordinary accidents and in a very material way to protect the occupants of the car and to protect the automobile itself against injury which would in a large measure be obviated were the structure I have set forth employed. It is believed this is clearly evident from the many automobile accidents in the use of cars by many different drivers in the present day and age.

In accordance with the patent statutes I have described the principles of operation of my invention and while I have illustrated a particular construction for my automobile, I desire to have it understood that it is only illustrative and that the invention can be carried out by other means and forms of construction without departing from the spirit of my invention within the scope of the following claims.

I claim:

1. In an automobile comprising a chassis frame having a seat mounted thereon, standards mounted upon the chassis frame and extending above the seat, an open frame mounted upon the upper ends of the standards above the seat, cushioning springs carried in the open frame and disposed above the seat, rib members disposed across the open frame, springs mounted upon the rib members, a second set of rib members mounted upon the last mentioned springs and a top member mounted upon the last mentioned rib members.

2. In an automobile, supporting standards, an open frame mounted upon the upper ends of the standards, cushioning springs carried in the open frame, rib members disposed across the open frame, springs mounted upon the rib members, a second set of rib members mounted upon the last mentioned springs and a top member mounted upon the last mentioned rib members.

3. In an automobile, supporting standards, an open frame mounted upon the standards, cushioning springs located within said frame, links and plates connecting said springs with the frame, rib members mounted upon the frame, springs mounted upon the rib members, a second set of rib members mounted upon the last mentioned springs and a top mounted upon the last mentioned rib members.

GEORGE F. NICHOLAS.